April 20, 1948.    G. C. MONACO    2,439,899
METHOD AND APPARATUS FOR COATING COMESTIBLES
Filed Jan. 31, 1944    5 Sheets-Sheet 1

INVENTOR
GEORGE C. MONACO
BY
ATTORNEY

Patented Apr. 20, 1948

2,439,899

UNITED STATES PATENT OFFICE 2,439,899

METHOD AND APPARATUS FOR COATING COMESTIBLES

George C. Monaco, Douglaston Hills, N. Y.

Application January 31, 1944, Serial No. 520,570

17 Claims. (Cl. 107—54)

This invention relates to coated comestibles and to an improved method and apparatus for making the same. More particularly the invention relates to comestibles like cookies, crackers, filled bars, doughnuts, cakes and the like having an edible coating such as an icing or filling on a surface thereof, and to a machine and process for coating the same while they are on a moving carrier, such, for example, as the endless band of a continuous baking machine.

One phase of the invention pertains to the appearance of the coated products and the prime object thereof is to provide a comestible having an attractive edible coating of distinctive design, differing radically from the present-day conventional icing of uniform thickness, and comprising a novel and ornamental pattern of venose appearance, the background of which is a film so thin that the comestible surface shows therethrough. A more particular object of the invention is to provide a comestible coating which consists of a series of prominent veins or ridges which are interconnected to form a tracery through whose openwork the comestible is visible. The term "tracery" is used herein to denote both (1) a ramose pattern of veins which are so interconnected that the veins do not cross each other and do not define a plurality of enclosed areas and (2) a reticular pattern of veins which are interlaced, i. e., cross one another, to resemble a network. The term "openwork" denotes the space between the veins and in a broader aspect of the invention includes both clear spaces of the comestible on which there is no coating and spaces on which a thin translucent film of a coating is deposited. An ancillary object of this phase of the invention is to provide a coating of venose design having portions of ramiform configuration and portions of irregular trunk-like appearance which extend across the comestible. A further ancillary object is to provide a coating of retiform design.

Another phase of the invention deals with the construction of the coating machine and an object thereof is to provide a machine capable of producing coated baked products of the type hereinabove described with great ease and rapidity and without forming a master pattern of the desired design on any machine element. Another object of the invention is to provide a machine of the character described which can be readily and easily manipulated to change the appearance of the venose tracery. A further object of the invention is to provide a machine construction wherein coating material is transferred from a hopper to baked comestibles by a roll and in which the material not deposited on the comestibles and returned to the hopper is trapped so that no matter how slowly the roll is turned the material returning to the hopper will not drop back on the carrier. Still another object of the invention is to provide a machine of the character described comprising relatively few and simple parts, and which is inexpensive to manufacture and efficient in use.

A further phase of the invention is concerned with the production of a striped coating on the comestibles and in this connection it is an object of the invention to provide for the coating machine a simple and flexible striping attachment which is capable of being easily adjusted to provide stripes of various widths and heights and of various configurations, such as rectilinear and sinusoidal. A more specific object of the invention is to provide a striping attachment which can readily change the amplitude and period of the sinusoidal stripes.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention and wherein like numbers refer to like parts throughout.

Figs. 8a through 16a are sections taken substantially along the lines 8a—8a through 16a—16a of Figs. 8 through 16 respectively, the same being illustrative of the prominence of the veins of icing;

In general, I effect the formation of the novel venose tracery of coating material by passing comestibles on a moving carrier, like the endless belt of a continuous baking oven, beneath a coating applicator, such as a roller or a belt which deposits a fluid, viscous coating material on the comestibles, causes the same to adhere thereto, and then moves in such direction that a portion of the applicator facing the comestible travels in the same direction as the comestibles while gradually moving away therefrom. The coating material, which adheres to both the comestibles and the applicator, is tensioned as the comestibles and applicator move apart causing it, because of its viscous fluid consistency, to form, in the main, into sheets which extend between the comestibles and roll. Said sheets are stretched and attenuated as the comestible and roll continue to move apart until the sheets snap, whereupon a portion of the coating material falls back against the comestible forming ridges on the surface thereof. The coating material comprising the ridges is viscous enough to approximately retain its own form until it has set or is of the type which will set quickly once it has been applied to the surface of a baked comestible, such quick setting being facilitated because of the heated condition of the comestible which has just emerged from an oven. Such coating materials are well known to the art, having been used heretofore, for example, when applying beads of icing to cookies in stripes which were not to run together. Many sheets of coating material are simultaneously formed on each comestible as it progresses beneath the applicator, these sheets being disposd at various angles to one another so that the ridges thus formed interconnect and/or interlace to effect a unique and ornamental design. The angles at which the sheets of coating material meet is largely a function of the relative speeds of the coating applicator and comestibles, and, in general, as the coating applicator increasse its relative speed the angle between the sheets will become larger. At very slow relative speeds of the applicator the angle between the sheets is slight and will cause the ridges of coating material to lie on the comestible almost parallel to the direction of travel of the comestible. I have also found that where the comestibles have a depression extending approximately parallel to the travel of the endless band, as is quite common in the formation of bars, the ridges tend to assume a ramiform design extending from one or more trunks which run substantially parallel to the direction in which the endless band is moving and along the length of the depressions in the comestible. It should be particularly noted that none of my unique venose designs can be obtained unless the facing surfaces of the comestibles and applicator move in the same direction while moving apart, and unless the coating material will retain its venose pattern and not merge into a flat coating of uniform thickness which covers substantially the entire coated surface of the comestible.

Referring now in detail to the drawings, and more particularly to Figs. 1 through 7, I have there disclosed a coating machine 20, used in conjunction with a metal conveyor band B on which there are disposed a plurality of endless baked pastry strips S arranged in closely spaced parallel relationship, as is well known to the art. The said conveyor band B may form part of a continuous baking machine in which said band successively passes beneath a station where dough or the like is deposited and then through an oven in which the dough is baked, the coating machine 20 being stationed near the exit of the oven. The dough may be deposited upon the band in the form of an endless strip such as shown, which may be cut into individual cookies, after coating, by a conventional knife. Dough may also be deposited on the band in dollops if the cookies are to be baked and coated individually or individual cookies may be baked in an ordinary oven and then placed on pans which are moved by suitable means through the coating machine.

The coating machine 20 includes a pair of spaced side plates 22, 24 to each of which a pair of brackets 26, 28 are welded. The brackets threadedly receive vertical threaded rods 30 carrying handles 32 at their upper ends. The lower tips of the rods 30 rest on the side frames 34 of the endless band conveyor. The side plates 22, 24 have bolted thereto in registered relationship bearings 36 in which the journals 38 of a coating roll 40 are rotatably mounted. Said roll may conveniently be in the shape of a hollow drum made, for example, of steel, so that the outer surface thereof is rigid and may be highly polished. One end of the roll has a shaft 42 extending therefrom, on which is mounted a sprocket 44 turned by a chain 46 in the direction indicated by the arrow A (Fig. 4), this direction being such that the lower portion of the roll facing the pastry strips travels in the same direction as the endless conveyor band B. The chain 46 is driven by a sprocket 48 which is operated through a variable speed reduction gear box 50 by a motor 52. Slack in the chain is taken up by an idler pulley 54. The reduction gear box has a plurality of speed selecting handles 56 which enable the roll 40 to be driven at any one of a plurality of speeds over a fairly wide range.

The side plates 22, 24 are permanently interconnected by a pair of oppositely inclined walls 58, 60, which with said side plates, form a hopper H in which a coating material such as the icing I is deposited. Each of these walls is reinforced against buckling and bulging by angle irons 62 which span the side plates 22, 24. The plate 60 functions as a doctor bar to regulate the thickness of the icing layer 64 which adheres to the coating roll as it leaves the hopper. I prefer to have the lower edge of said plate 60, which is the exit edge of the hopper, disposed below the horizontal plane passing through the longitudinal axis of the roll, as this seems to effect a better regulation of the icing layer and, by controlling the thickness thereof at a point near where coating takes place, offers less opportunity for the icing layer to become uneven before it reaches the comestibles.

The other wall 58, which defines the front of the hopper H, has its lower edge, the entrance edge of the hopper, disposed in back (to the right as viewed in Fig. 4) of the vertical plane passing through the longitudinal axis of the roll. This permits icing which remains on the roll after comestibles have been coated and which is being returned to the hopper, to accumulate in front of the wall 58 and between said wall and the top of the roll where it will not run back down the roll and drop on the surface of the belt. Thus, this portion of the roll between the top thereof and the wall 58 acts as a trap to retain coating material being returned to the hopper. I have found that this arrangement of the parts also prevents the viscous coating material from leaking out of the hopper when the roll 40 is stopped.

Although I have indicated above that the lower edge of the wall 60 can serve as the doctor plate, it is preferable for the lower edge of an auxiliary adjusting plate 66 to be used for this purpose, since if said wall is adjustably mounted, coating material tends to leak around its ends. The plate 66 lies flat against the inner face of the plate 60 and the lower edge thereof can be moved towards and away from the coating roll 40 by a pair of adjusting rods 68. These rods each have a threaded shank which is screwed into a tapped aperture in the reinforcing angle iron 62 for the plate 60 and, in addition, they are provided with a pair of collars 70 which serve to rotatably and non-shiftably secure to the rod 68 an angle 72 having a leg welded to the auxiliary adjusting plate 66. It is obvious that rotation of the rod 68 will serve to move the lower edge of the adjusting plate 66 toward or away from the roll 40. It may be mentioned that two adjusting rods 68 are provided so as to enable the edge of the plate 66 to be set parallel to the coating roll.

In order for the coating roll 40 to treat all the pastry strips across the width of the conveyor in a substantially uniform manner, I provide a pair of spaced conveyor band supporting rollers 74, 76 which are journalled in bearing plates 80. Said bearing plates are adjustably hung by bolts 82 from the side frames 34 of the band conveyor. These rollers lie on both sides of the coating roll beneath the band B and are so adjusted that they carry the full weight of the band in the region of the coating station. Said rollers cause the band to present a level yielding surface as it carries comestibles beneath the coating roll, thereby minimizing the tendency to break comestibles under the substantial pressure to which a comestible is subjected, as will soon appear, when coated in accordance with my invention.

The coating material which is preferably employed in operating the machine 20 pursuant to my invention is of a fluid viscous consistency and quick-setting under its conditions of use. By way of example and without in any way limiting the invention to the particular coating material now to be described, I have given below a formula for making an icing with which satisfactory results have been obtained in the practice of my invention:

| | | |
|---|---|---|
| Confectioners' sugar | lbs | 55 |
| Gelatine | lbs | 10 |
| Warm water (about 100° F.) | qts | 6 |
| Lemon oil | ozs | 1½ |

The above ingredients are employed in the following manner to prepare an icing. The gelatine is thoroughly dissolved in two quarts of warm water; then the sugar and four quarts of water are placed in a beater and mixed until the sugar is thoroughly dissolved. The gelatine mixture and lemon oil are next added to the beaten mixture of sugar and water and all the ingredients beaten for approximately twenty minutes. This icing will be hereinafter referred to as the "regular" icing.

I have also employed coating materials generally similar to that above described which were more viscous and less fluid, the same being obtained by using less water with the foregoing amounts of sugar, gelatine and oil. Thus, one such icing used but five quarts of warm water to obtain what is known in the trade as a "tight" icing. At other times, I have used only four quarts of water to obtain a "very tight" icing. Both of these latter icings worked satisfactorily in accordance with my invention.

Figure 6:
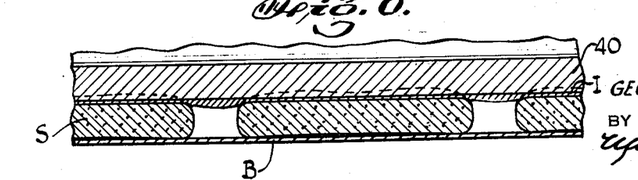
Fig. 6 is an enlarged sectional view of the pastry strips on said band as they pass beneath the coating roll, said view being taken substantially along the line 6—6 of Fig. 4.
Figures 7, 17, 18, 19, 20:
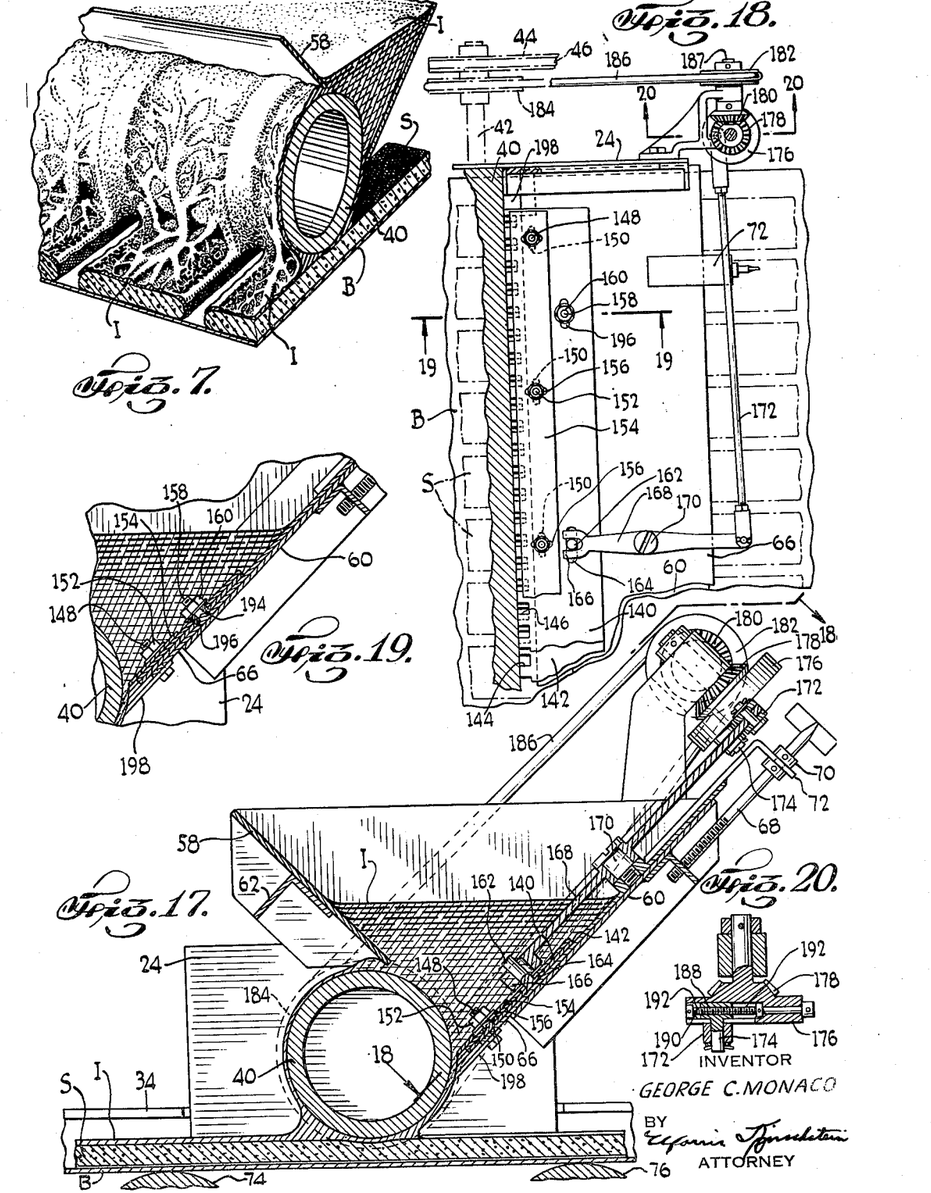
Fig. 7 is a detail perspective view of the pastry strips, coating material and coating roll at the point where the strips emerge from beneath the roll and is illustrative of the manner in which the coating is formed into a venose tracery.
Fig. 17 is a view similar to Fig. 4 through the coating machine with a striping attachment secured thereto.
Fig. 18 is an enlarged fragmentary view thereof taken substantially along the line 18—18 of Fig. 17.
Fig. 19 is an enlarged sectional view taken substantially along the line 19—19 of Fig. 18.
Fig. 20 is an enlarged detail view taken substantially along the line 20—20 of Fig. 18, the same being illustrative of the mechanism for adjusting the amplitude of sinusoidal stripes.

To operate the machine 20, the band supporting rollers 74, 76 are first brought up high enough to remove the central upward bulge from the band and present a plane, level and yielding surface beneath the coating roll. The rollers and coating roll are also adjusted to bring their axes of rotation into parallelism so that all comestibles across the band will be uniformly treated. The hopper is then filled with a coating material and rotation of the coating roll started, this being done as comestibles such, for example, as the baked pastry strips, begin to approach the coating station, or when it is desired to have a coating applied to the comestibles. The height of the coating roll is adjusted, as the comestibles pass therebeneath, in such manner that the coating roll will press the coating material thereon heavily against the comestibles and thereby cause the coating material to adhere firmly to the entire upper surface of each comestible. Satisfactory results are obtained when the coating roll is lowered to such an extent that even with no coating material thereon it will depress the surface of the comestibles. When coating material is present on the roll it will be carried between the surface of the roll and the comestible and form a cushion, as shown in Fig. 6, between said roll and the comestible which further depresses the comestible. The thickness of this cushion will in part be governed by the position of the doctor edge of the adjusting plate 66, which can be set by manipulation of the rods 68. In practice the speed and elevation of the roll and position of the adjusting plate are all manipulated until a satisfactory venose design of coating material appears on the comestibles, the character of the design being almost wholly dependent on the speed of the roll and the amount of coating material deposited being dependent on the speed and elevation of the roll and the position of the adjusting plate.

The cushion of coating material which is present between the comestibles and the coating roll adheres to both the comestibles and the roll so that as the roll begins to move away from the comestibles the major part of the cushion of viscous coating material is stretched into sheets extending approximately vertically between the comestibles and the roll and thickest adjacent said comestible and roll. The remainder of the cushion is thinned into a film over the comestible and rolls to maintain the requisite adhesion between the coating material, and the roll and comestible. As the roll continues to rotate, said sheets are elongated and attenuated centrally until they break, whereupon the lower portions of the sheets snap back against the comestible, forming ridges on the surface thereof whose relative angular positions on the comestible correspond to the angular positions of the sheet. The upper portions of the sheet snap back against the roll and form a similar pattern of ridges on the roll, which are removed when that portion of the roll re-enters the hopper.

Large numbers of such sheets are always being formed and snapped on each comestible at the same time where the comestible is emerging from beneath the coating roll and quite often only the front portion of the sheet will snap while the part nearer the roll attenuates further. These sheets will be variously relatively angularly disposed depending upon many factors, chief among which is the ratio of speeds of the band and coating roll. However, even at a given speed of roll and band, the angles between the sheets are constantly changing, due probably, to irregularities in the surface of the comestible, unevenness in the apparently uniform composition of coating material, and vibrations induced by the operation of the machine. The several sheets extant at any given time, are ordinarily interconnected so that a continuous venose pattern will be formed on the surface of the comestibles rather than isolated designs.

I have observed that the height or prominence of the veins of coating material on the surface of the comestibles will, up to a certain point depending upon the viscosity of the coating material, speed of the roll and thickness of the layer 64 of coating material, increase as the space between the roll and comestible is increased at the point where the comestible passes beneath the roll. This feature may be taken advantage of to produce a markedly prominent pattern of ridges of coating material on the surface of the comestible by slightly raising the roll. However, if the roll is raised too much, this tendency to increase the height of the veins of coating material is reversed. The prominence of the veins may also be accentuated by increasing the viscosity of the coating material, raising the speed of the roll or thickening the layer 64 of coating material.

Figure 1:
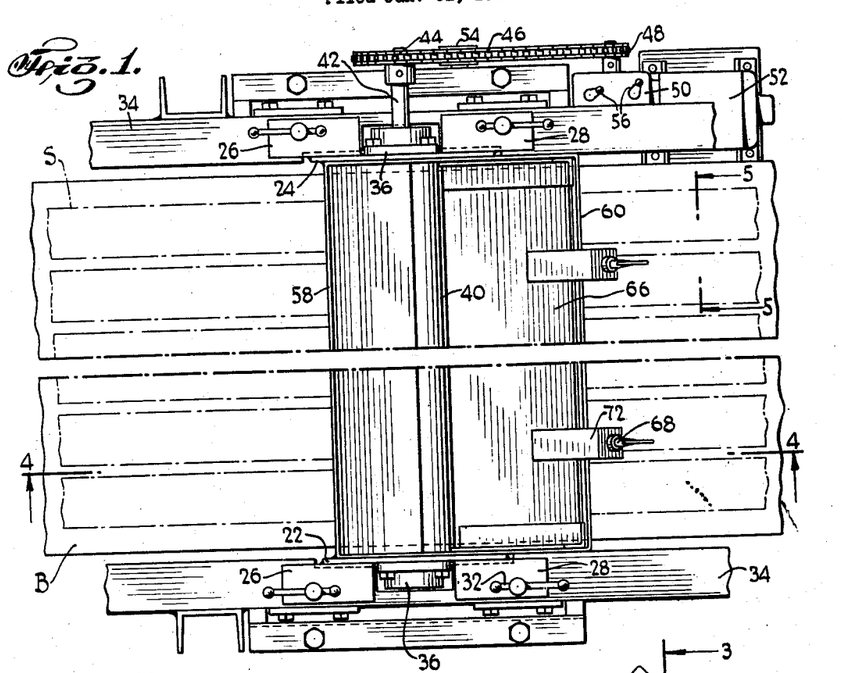
Fig. 1 is a top plan view of a coating machine which embodies the invention being used to coat pastry strips carried on the endless band of a continuous baking machine.
Figures 2, 5:
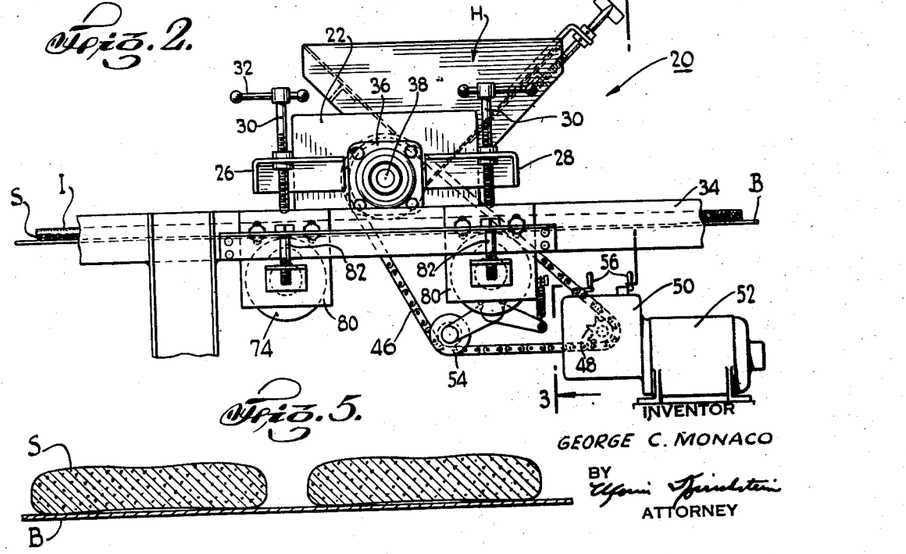
Fig. 2 is a side elevational view thereof.
Fig. 5 is an enlarged sectional view through pastry strips on the band prior to coating, said view being taken substantially along the line 5—5 of Fig. 1.
Figure 3:
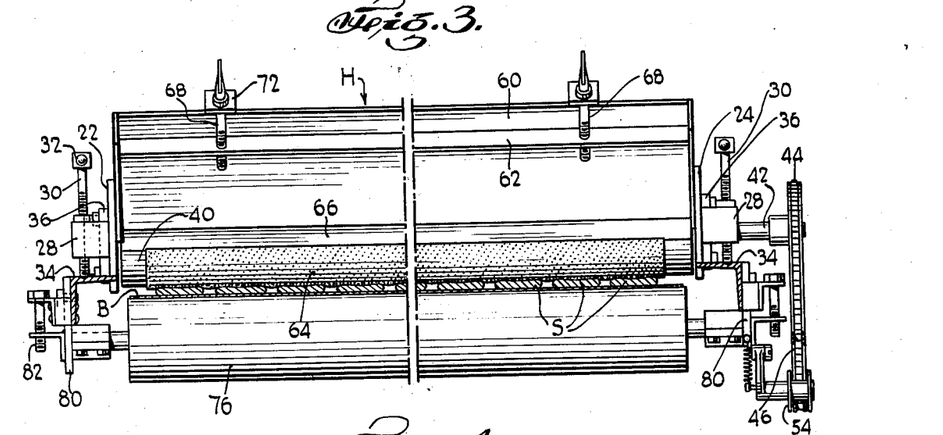
Fig. 3 is a sectional view taken substantially along the line 3—3 of Fig. 2.
Figure 4:
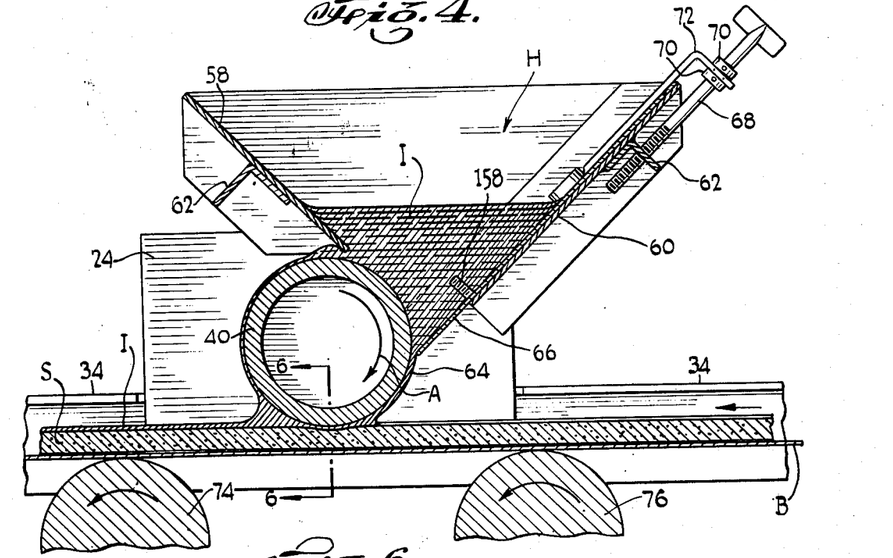
Fig. 4 is an enlarged sectional view taken substantially along the line 4—4 of Fig. 1.

At lower speeds of the roll the venose design is mainly, if not entirely, of ramiform configuration. This characteristic may be emphasized by having a portion of the comestible which extends approximately parallel to the direction of travel of the band, provided with an elongated depressed surface such, for example, as is found in bars. As is known to the art, the center of these bars may, by a proper admixture of the shortening and other constituents of the bar, be sunk slightly, as shown in Fig. 5. Where comestibles of this character are coated in the machine 20 in accordance with my invention, there is a tendency for the cushion of coating material to be slightly thicker near the center of the depression as the strip passes beneath the roll. This added thickness results in the formation of thicker sheets, which have a tendency to extend along the longitudinal axis of the depression and the direction of travel of the band. However, because the cushion of coating material to both sides of the depression is of lesser thickness, the sheets on these lateral portions of the comestible extend at various angles to each other, diverging, in general, away from the sunken portion at the center of the comestible. This results in a ramiform configuration with one or more heavy, well-defined trunks at the center of the comestibles running parallel to the longitudinal edges thereof.

In Figs. 8–16 and 8a–16a, I have shown in plan and section, respectively, a set of cookies, ornamented in accordance with my invention, with various typical venose patterns of an icing such as described above. These cookies in each instance were originally part of baked pastry strips which were iced in the machine 20 pursuant to my novel method and then cut from said strips. The "length" of these cookies and of any comestible coated according to my invention will be considered to be that dimension of the comestible parallel to the direction of travel of the cookies beneath the coating applicator. In each of the cookies illustrated, the top of the cookies, in the plan view, was the first portion thereof to emerge from beneath the coating roll.

Figure 8:
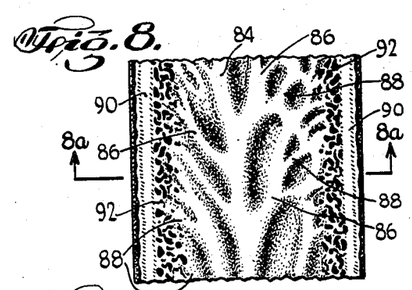
Figs. 8 through 16 are top plan views of cookies having different iced venose traceries imparted by the foregoing machine.
Figure 8A:
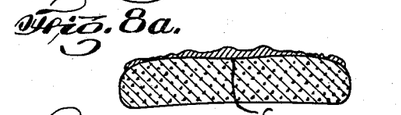

The cookie shown in Fig. 8 has a sunken longitudinally extending central portion C through which a main heavy trunk-like ridge 84 of icing runs approximately parallel to and midway between the longitudinal edges of the cookie. Extending away from the trunk 84 are several main branches 86 of icing, from which minor branches 88 of icing angularly project. Between these minor branches and the lateral edges of the cookie, where, due to the rounded profile, a heavy bead 90 of icing is formed there is a delicate filigree 92 consisting of many fine, elaborately interlaced veins of icing. The trunk 84 and beads 90 are the most prominent of the ridges, the main brances 86 less prominent, the minor branches 88 even less prominent, and the veins of the filigree 92 the least prominent. A "regular" icing was employed on these cookies. The speed of the conveyor band was twelve feet per minute and the linear speed of the icing roll 40 was seventeen feet per minute.

The specific design attained will vary slightly from cookie to cookie and from time to time during the day, this variation being due to a variety of factors such as changes in the viscosity of the coating material, changes in atmospheric conditions and changes in the texture of the baked product.

Figure 9:
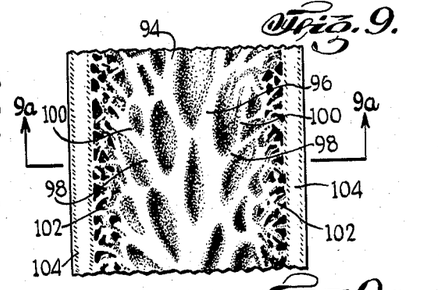
Figure 9A:
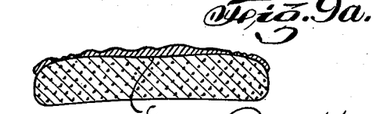
Figure 10:
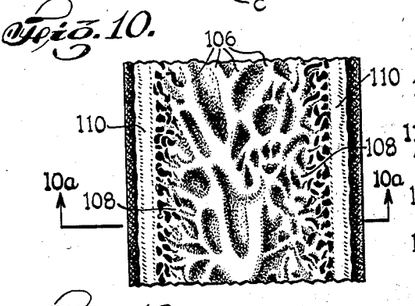
Figure 10A:
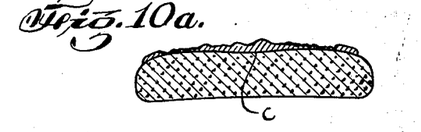

In Figs. 9 and 10 I have shown cookies iced under the same conditions as those specified for the cookies shown in Fig. 8, but on different days. Both cookies have sunken central portions C. The icing design of the cookie illustrated in Fig. 9 has two main heavy ridges 94, 96 which extend parallel to the direction of travel of the cookie. Main branches 98 fork away from the trunks 94, 96 and minor branches 100 connect the main branches and the lateral boundary filigrees 102. The edges of the cookie parallel to the trunks 94, 96 have heavy beads 104 of icing similar to the beads 90 of the cookie shown in Fig. 8. The cookie shown in Fig. 9 differs from that shown in Fig. 8 mainly by the presence of two rather than one trunk.

The icing design of the cookie shown in Fig. 10 does not include a well-defined trunk, but all of the veins of icing 106 at the center of the cookie are of substantially the same height and width. In this design the filigree 108 extends from the heavy lateral beads 110 to the central beads 106.

Figure 11:
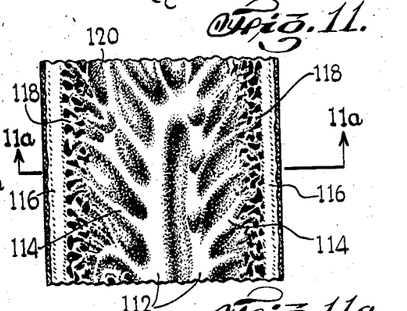
Figure 11A:
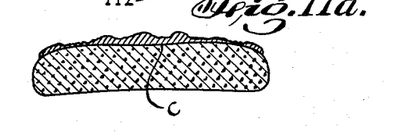

The cookie shown in Fig. 11 likewise has a sunken center C and was iced at the same belt and icing roll speed as the cookies illustrated in Figs. 8-10. However, a tight icing was used. As is apparent from inspection of Figs. 8-10 and 11, in general the use of a tighter icing results in more clearly defined and more prominent veins of icing. The venose design disclosed in Fig. 11 includes two separate almost parallel heavy trunk-like ridges 112. Branches 114 of icing extend laterally outward from the trunk 112 toward the heavy lateral beads 116. The filigree 118 in this instance is rather narrow in width and there are but few minor branches 120, compared to the minor branches present in the cookies shown in Figs. 8 and 9.

I have found that a venose design of coating material is formed as long as the roll moves in the same direction as the band. This applies when the roll has a very low linear speed of as little as one and one-half feet per minute or one-eighth of the speed of the band. It applies equally well when the roll runs much faster than the band. However, it is not practical to run the roll at a speed much greater than four times that of the band as, although a venose pattern of coating material is imparted at great roll speeds, there is a tendency for the roll to bring too much coating material to the comestible and this extra material runs off the sides of the cookies on to the band.

I have also found that the relative speeds of the band and roll greatly affect the character of the design and particularly the angle at which veins of coating material extend laterally.

Figure 12:
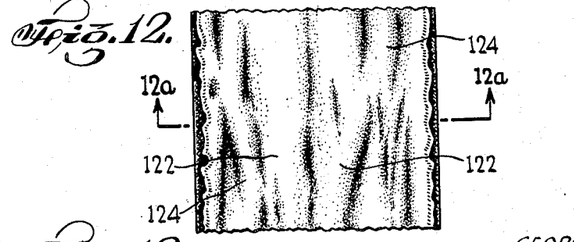
Figure 12A:
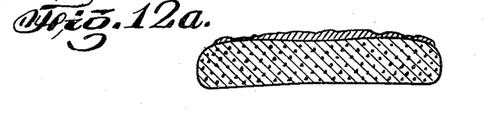

In Figs. 12-16 I have shown icing designs resulting from employing different linear speeds of the coating roll with a fixed speed of the band, to wit, twelve feet per minute. In Fig. 12 the icing design is a result of employing a regular icing with a linear roll speed of one and one-half feet per minute. Note that the central trunk-like beads 122 have spread considerably because of the drag of the roll and are much flatter than the trunk-like beads of icing shown in Figs. 8, 9 and 11. Likewise, the branching beads 124 are of greater width. The angle at which these branches of icing extend from the trunk is much less than that at which the veins of icing extend laterally in all of the cookies in Figs. 8 through 11. The background of icing covering the surface of the cookie in the open spaces between the branches and trunks is also considerably heavier than the background covering the surface of the cookie when the icing travels at higher speeds. It will be appreciated, however, that despite the very low linear speed of the roll, a definite venose design still appears indicating that as long as the roll has a positive motion with a component in the same direction as the direction of travel of the band a venose pattern of coating material will appear on the surface of the comestible.

Figure 13:
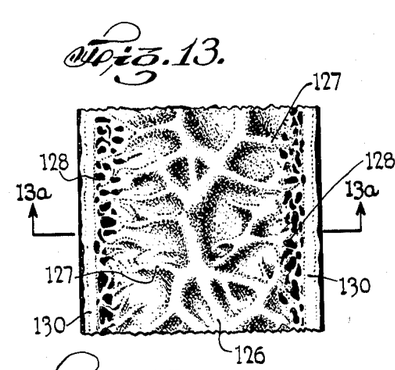
Figure 13A:
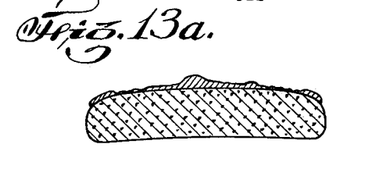

The icing design shown in Fig. 13 was imparted at a roll speed of forty-two and one-half feet per minute, the icing being very tight. It will be noted that the central icing trunk 126 is very prominent and has a zig-zag configuration. It is also pointed out that the branches 127 extend away from the central trunk at an angle of substantially 90°. The laterally disposed reticulations 128 and beads 130 are likewise present. This design is not noticeably changed at a linear roll speed of forty-five feet per minute and at higher roll speeds some icing is forced off the cookie onto the belt.

It is observed that as the linear speed of the coating roll is increased relative to the band speed, the angle between the branches of coating material and the central trunk of coating material increases up to about 90°, and it is believed that in general this angle can be controlled by regulating the relative speeds of the roll and comestible carrier.

Figure 14:
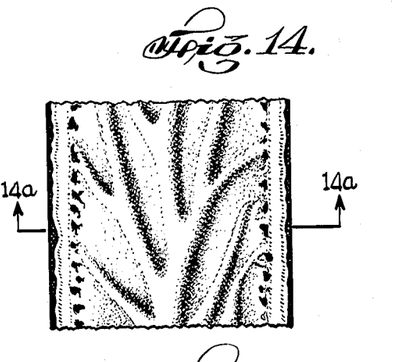
Figure 14A:
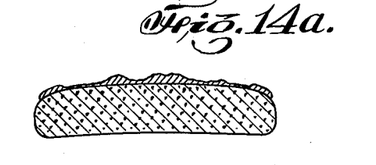

The icing design shown in Fig. 14 was imparted at a linear roll speed of seven feet per minute, a tight icing being employed. Note that the design shown in said figure does not differ essentially from that illustrated in Fig. 8 and that the angle between the branches of icing and the central icing trunk has decreased slightly with the decrease in speed of the roll relative to that of the band.

Figure 15:
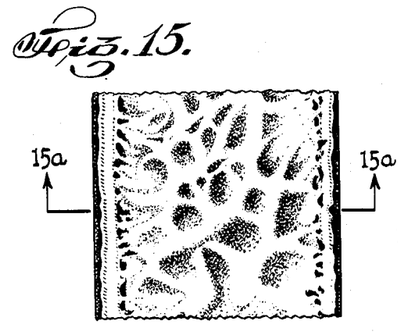
Figure 15A:
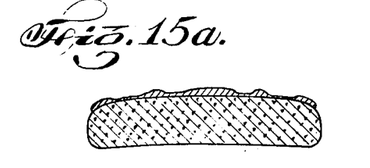

The icing shown in Fig. 15 was obtained at a linear roll speed of thirty feet per minute with very tight icing. In this design substantially the entire surface of the cookie is covered by a filigree whose openings are larger at the center and smaller laterally.

Figure 16:
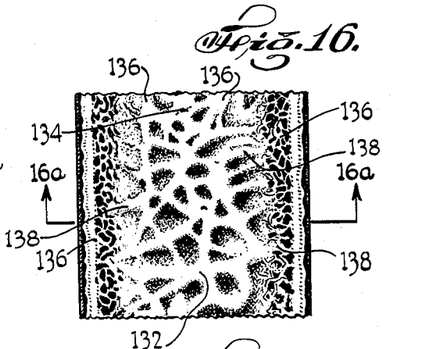
Figure 16A:
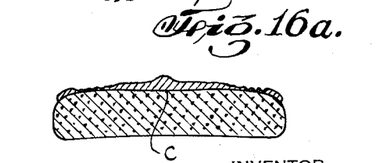

The icing design shown in Fig. 16 is still another example of the novel patterns which may be imparted to cookies in accordance with my invention. Said design was obtained by running the roll at twenty-five and one-half feet per minute with very tight icing. Note that in this case there is a central longitudinally extending panel 132 of retiform design which has two definite boundaries 134 and that there is also a laterally disposed reticulation 136 adjacent the edges of the cookie, the spaces between the central and lateral reticulations having branches 138 of icing running thereacross.

As will be appreciated from an examination of Figs. 8 through 16, the venose pattern imparted by the coating machine has the same general appearance along the length of the comestibles, that is, the design gives the effect of being repetitive linearly along the dimension of the cookie parallel to the direction of travel of the band. However, a closer study of the cookies will show that the design does not exactly repeat itself lengthwise of the cookie but is only of the same general arrangement. This lends a highly distinctive appearance to the coated comestible which cannot be duplicated by mechanically repeating a pattern. Said characteristic is believed to be best described by the term "linear similarity of design" and when this term or its derivatives are hereinafter employed it will be understood to mean a design of the character just described. It is also pointed out that the various designs are irregular, that is to say, they are not symmetrical or of regular geometrical form. However, since this irregularity is approximately regularly repeated along the length of the cookie, the ornamental coating can be said to have a "linear similar irregularity of design."

It is possible to obtain a striped design with the coating machine 20, that is, a design in which parallel beads of coating material are laid on the comestible in accordance with a predetermined plan, as distinguished from the design hereinabove described whose exact pattern cannot be exactly controlled and repeated, although its general appearance can. Such a striped design can be laid on a comestible with the aid of a striping attachment which is shown in position in Figs. 17 through 20. Said attachment consists of a pair of elongated strips 140, 142 which are adapted to be secured to the auxiliary adjusting plate 66 and extend beyond the lower edge thereof. The overhanging edges of said strips have an identical series of regularly spaced kerfs 144, 146, the tips of the teeth intermediate the kerfs riding on the smooth surface of the coating roll and being tapered to conform to the surface of said roll. The lower kerfed strip 142 has a plurality of threaded rods 148 slidably received in slots 150 in the upper strip 140. Said rods project above the upper strip to receive nuts 152 which serve to clamp the plates together. When the nuts are loosened and the strips relatively moved, slots of any desired effective width will be obtained, the slots being defined by the overlapping kerfs and determining the width of the stripes of coating material which are deposited on comestibles. It may be noted that where the coating material is restricted in this manner to narrow stripes in the roll, parallel stripes will be formed on comestibles regardless of the relative directions of travel of the roll and comestible carrier.

Means may also be provided to regulate the height of the stripe of coating material formed on the roll whereby to indirectly control the height of the stripe of coating material laid on the comestible. Such means may comprise a third elongated strip 154 which is bolted to the upper kerfed strip 140. One longitudinal edge of the strip 154 overlies the bases of the kerfs 144, 146 and limits the depth of the effective notches formed thereby. This strip 154 is held in position by the aforesaid rods 148 and nuts 152 which slidably extend through transverse slots 156 in said strip running perpendicular to the longitudinal axis of the coating roll.

It may be mentioned that before the kerfed strips 140, 142 are mounted on the adjusting plate 66 said plate is retracted from the coating roll a sufficient distance to permit the notched edges of the strips to substantially overhang the doctor edge of said adjusting plate. After said strips are mounted the adjusting plate is advanced to permit the arcuate tips of the projections between kerfs to press lightly against the surface of the roll. Such pressure is sufficient to remove most of the coating material from the roll and prevent any material from being applied to a comestible between the stripes.

The strips 140, 142 are secured to the adjusting plate by threaded rods 158 welded to said plate and extending through the strips. The ends of said rods receive nuts 160 which hold the strips captive.

It will be appreciated that the beads of coating material applied in the foregoing manner are rectilinear and, if the kerfed strips remain stationary, said beads will extend parallel to the direction of movement of the band. It may be desirable to vary the design imparted by causing the parallel beads of coating material to assume a sinusoidal plan configuration. To accomplish this, I may provide in the striping attachment a means for reciprocating said kerfed strips. Such means may comprise a pin 162 secured to the bottom kerfed strip and extending through a slot 164 on the top kerfed strip whereby to permit relative longitudinal adjustment of said strips. The projecting portion of said pin is slidably received between fingers 166 of a yoke at one end of a lever 168, which is pivotally mounted at 170 on the adjusting plate 66. The other end of said lever is pivotally connected to an end of a connecting rod 172, the far end of which is rotatably secured to a crank pin 174 (Fig. 20) extending from a disc 176. The disc is turned by a pair of bevel gears 178, 180, the latter of which is driven by a pair of sheaves 182, 184 and resilient belt 186 from the shaft 42. The sheave 182 is detachably mounted on the shaft 187 connecting it to the gear 180 so that it can be replaced with sheaves of various diameters in order to vary the period of rotation of the crank pin 174. It will be appreciated that the foregoing drive will oscillate the kerfed strips 140, 142 and impart a sinusoidal configuration to the beads of icing whose frequency or period (the distance between successive peaks) may easily be changed.

It may also be desirable to vary the amplitude of the sinusoidal stripes and for this purpose the pin 174 may be mounted on a block 188 (Fig. 20) which is slidably received in a way 190 in the disc 176. A threaded shaft 192 journalled in said disc and extending longitudinally of the way 190 is threadedly received in said block so that angular movement of said shaft will alter the radial spacing of the crank pin 174 relative to the center of said disc 176. This will change the stroke of the lever 168 and thus vary the amplitude of the sinusoidal stripes. It may be mentioned that as long as the stripes are kept comparatively narrow, even when the coating roll and comestible carrier are traveling in the same direction, no veins will appear therein. I have obtained satisfactory results with stripes one-eighth of an inch wide spaced five-eighths of an inch apart.

In order to allow the kerfed strips 140, 142 to oscillate in the foregoing manner, while being captively held to the adjusting plate 66, each threaded rod 158 is enclosed in a collar 194 which is slidably received in slots 196 in said strips extending parallel to the longitudinal axis of the icing roll. The collars are slightly higher than the combined thickness of the strips so as to prevent the nut 160 from an inhibiting movement of the strips. It will be appreciated that these slots cause the strips to oscillate in a proper predetermined path. It will also be noted that said strips are shorter than the span between the side plates 22, 24 to permit lateral shifting of said strips. Auxiliary blades 198 secured beneath the adjusting plate 66 prevent coating material from dropping through the spaces thus formed.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I desire to secure by Letters Patent:

1. A method of coating a comestible with an applicator having a viscous, fluid, edible coating material adhered to a surface thereof, comprising moving the comestible along a predetermined path of travel, moving said applicator so as to cause the surface carrying coating material to approach the comestible and deposit material on a surface thereof, then to depress the surface of the comestible with a layer of coating material between said applicator surface and said comestible surface and finally to leave the comestible in a direction having a component of travel moving in the same direction as the comestible and a component of travel moving perpendicular thereto, whereby the material is pulled out into interconnected relatively angularly disposed sheets which are attenuated until they snap and the portions thereof which fall back against the comestible form prominent interconnected relatively angularly disposed ridges on the surface of the comestible.

2. A method as set forth in claim 1 wherein the surface of the applicator carrying coating material moves at a speed of not greater than forty-five feet per minute.

3. A method as set forth in claim 1 wherein the surface of the applicator carrying coating material moves at a speed of from about one and one-half to forty-five feet per minute.

4. A method as set forth in claim 1 wherein the surface of the applicator carrying coating material moves at a speed not greater than about four times the speed of the comestible.

5. A method as set forth in claim 1 wherein the surface of the applicator carrying coating material moves at a speed of from about one-eighth to four times the speed of the comestible.

6. A method of applying to a comestible carried on a moving carrier a viscous, fluid, edible coating material which is adhered to the cylindrical surface of a coating roll whose axis of rotation is transverse to the direction of movement of the carrier, said method comprising arranging said roll so as to depress the surface of the comestible with a layer of coating material between the cylindrical surface of said roll and the surface of said comestible and turning said roll in such direction as to cause the material thereon to approach the surface of the comestible and be pressed thereagainst so as to adhere thereto and then leave the surface of the comestible while moving in the same direction as the carrier, whereby the material is pulled out into interconnected relatively angularly disposed sheets which are attenuated until they snap and the portions thereof which fall back against the comestible form prominent interconnected relatively angularly disposed ridges on the surface of the comestible.

7. A method as set forth in claim 6 wherein the relative linear speeds of the carrier and the cylindrical surface of the roll are from about 1:⅛ to 1:4.

8. A method as set forth in claim 6 wherein the linear speed of the cylindrical surface of the roll is never more than about four times the speed of the carrier.

9. An apparatus for coating a comestible carried on an endless metal band, said apparatus comprising a coating roll having a cylindrical surface whose axis of revolution is disposed above and parallel to the band, and band supporting means for causing the portion of the band carrying a comestible during coating to have a plane upper surface, said band supporting means comprising a pair of spaced rollers beneath the band, one to either side of the coating roll, the axes of revolution of said rollers and roll being parallel to the band.

10. An apparatus as set forth in claim 9, wherein means is provided to separately vertically adjust each of said rollers.

11. An apparatus for coating a comestible, said apparatus comprising a hopper for a fluid edible coating material, said hopper having an open discharge mouth, and a coating roll which is rotatably mounted and so arranged as to have a portion thereof disposed within said mouth, means to turn the roll, said roll carrying a layer of coating material as it leaves the hopper, a portion only thereof being removed for coating, the wall of the hopper defining the edge of the mouth where the roll enters the hopper being spaced from the top of the roller in the same direction as the direction of travel of the roll whereby to leave the portion of the roll between the top thereof and the entrance edge of the hopper wholly free and exposed to trap coating material returning to the hopper.

12. A striping machine comprising a hopper having an open discharge mouth, a coating roll rotatably mounted and so arranged as to have a portion thereof disposed within said mouth, a notched doctor blade at the exit edge of said hopper, and means to reciprocate said blade relative to said roll in a direction parallel to the axis of revolution of said roll.

13. A striping machine comprising a hopper having an open discharge mouth, a coating roll rotatably mounted and so arranged as to have a portion thereof disposed within said mouth, a notched doctor blade at the exit edge of said hopper, means to reciprocate said blade relative to said roll in a direction parallel to the axis of rotation of said roll, and means to vary the period of reciprocation.

14. A striping machine comprising a hopper having an open discharge mouth, a coating roll rotatably mounted and so arranged as to have a portion thereof disposed within said mouth, a notched doctor blade at the exit edge of said hopper, means to reciprocate said blade relative to said roll in a direction parallel to the axis of revolution of said roll, and means to vary the amplitude of reciprocation.

15. A striping machine comprising a hopper having an open discharge mouth, a coating roll rotatably mounted and so arranged as to have a portion thereof disposed within said mouth, a notched doctor blade at the exit edge of said hopper, means to reciprocate said blade relative to said roll in a direction parallel to the axis of revolution of said roll, and means to vary the period and amplitude of reciprocation.

16. A striping machine comprising a hopper having an open discharge mouth, a coating roll rotatably mounted and so arranged as to have a portion thereof disposed within said mouth, a notched doctor blade at the exit edge of said hopper, said blade including a pair of elongated identically kerfed strips, means to allow relative longitudinal movement of said strips, and means to lock said strips in any relative relationship whereby to vary the effective width of the notches in said doctor blade.

17. A striping machine comprising a hopper having an open discharge mouth, a coating roll rotatably mounted and so arranged as to have a portion thereof disposed within said mouth, a notched doctor blade at the exit edge of said hopper, said blade including a pair of elongated identically kerfed strips, means to allow relative longitudinal movement of said strips, means to lock said strips in any relative relationship whereby to vary the effective width of the notches in said doctor blade, and means to vary the depth of said notches.

GEORGE C. MONACO.

REFERENCES CITED

The following references are of record in the file of this patent:

UNITED STATES PATENTS

| Number | Name | Date |
|---|---|---|
| 990,168 | Scott | Apr. 18, 1911 |
| 1,101,200 | Leister et al. | June 23, 1914 |
| 1,153,585 | Vicars | Sept. 14, 1915 |
| 1,602,228 | Huestis | Oct. 5, 1926 |
| 2,058,369 | Taylor | Oct. 20, 1936 |
| 2,068,761 | Penley | Jan. 26, 1937 |
| 2,144,371 | Griffith | Jan. 17, 1939 |
| 2,182,068 | Clark | Dec. 5, 1939 |
| 2,205,317 | Studebaker | June 18, 1940 |
| 2,220,971 | MacManus | Nov. 12, 1940 |
| 2,320,529 | MacManus | June 1, 1943 |
| 2,334,654 | Sportolari | Nov. 16, 1943 |
| 2,348,800 | Fredrickson | May 16, 1944 |